(12) United States Patent
William

(10) Patent No.: US 8,291,678 B2
(45) Date of Patent: Oct. 23, 2012

(54) MODULAR CONSTRUCTION SYSTEM

(76) Inventor: Hunter George William, Hampshire (GB)

( * ) Notice: Subject to any disclaimer, the term of this patent is extended or adjusted under 35 U.S.C. 154(b) by 0 days.

(21) Appl. No.: 12/990,013

(22) PCT Filed: Jun. 29, 2009

(86) PCT No.: PCT/GB2009/001634
§ 371 (c)(1),
(2), (4) Date: Nov. 19, 2010

(87) PCT Pub. No.: WO2009/144484
PCT Pub. Date: Dec. 3, 2009

(65) Prior Publication Data
US 2011/0061338 A1    Mar. 17, 2011

(30) Foreign Application Priority Data
Apr. 29, 2008 (ZA) .................. 2008/03714

(51) Int. Cl.
*E04C 3/00* (2006.01)
*F16D 1/033* (2006.01)

(52) U.S. Cl. .......... 52/849; 52/837; 52/582.1; 52/127.7; 403/337

(58) Field of Classification Search ............ 52/831, 52/837, 838, 848, 849, 854, 582.1, 127.7, 52/653.1, 655.1, 660, 663, 673, 675; 403/178, 403/173, 262, 335, 337
See application file for complete search history.

(56) References Cited

U.S. PATENT DOCUMENTS

| | | | |
|---|---|---|---|
| 1,818,418 A * | 8/1931 | Millard | 52/263 |
| 3,716,959 A * | 2/1973 | Bernardi | 52/838 |
| 3,749,432 A * | 7/1973 | Janssen | 52/476 |
| 4,047,341 A * | 9/1977 | Bernardi | 52/837 |
| 4,330,221 A * | 5/1982 | Stumm | 403/218 |
| 5,630,298 A * | 5/1997 | Tsai et al. | 52/167.3 |
| 5,848,512 A * | 12/1998 | Conn | 52/837 |
| 7,127,863 B2 * | 10/2006 | Simmons | 52/838 |
| 7,568,856 B2 * | 8/2009 | Wu et al. | 403/377 |
| 7,762,038 B2 * | 7/2010 | Ceba et al. | 52/653.1 |
| 7,874,120 B2 * | 1/2011 | Ohata et al. | 52/655.1 |
| 8,065,855 B2 * | 11/2011 | Wood | 52/843 |
| 2007/0209314 A1 * | 9/2007 | Vaughn | 52/720.1 |

FOREIGN PATENT DOCUMENTS
DE         2644040 A1 *   4/1978
WO    W02006086803 A1     8/2006
* cited by examiner

*Primary Examiner* — Brian Glessner
*Assistant Examiner* — Brent W Herring
(74) *Attorney, Agent, or Firm* — Duft Bornsen & Fishman LLP (57) ABSTRACT

A modular construction system includes an elongate construction element. The element has an elongate body including a longitudinal web, defining opposite first and second edges and a longitudinal first centerline, and a longitudinal first flange transverse to the web along the first edge, the elongate body defining opposite first and second ends. At the first end, a first end plate is provided that is orthogonal to the first centerline. Defined through the first end plate are a first hole on the first centerline, a second hole intermediate the first hole and the first edge, and a third hole intermediate the first hole and the second edge. The holes are preferably equispaced. For each of the holes, a cut-out is provided in the web. The cut-out allows insertion of a shaft of a bolt through the hole while accommodating the head of the bolt. First and second types of jointing element for coupling a number of elongate construction elements thereto to form a permanent or temporary structure are also described.

19 Claims, 9 Drawing Sheets

MODULAR CONSTRUCTION SYSTEM

RELATED APPLICATIONS

This application is the National Stage under 35 U.S.C. 371 of International Application No. PCT/GB2009/001634, filed Jun. 29, 2009, which claims priority from South African Patent Application No. ZA 2008/03714, filed Apr. 29, 2008, which is incorporated by reference herein.

BACKGROUND

This disclosure relates to a modular construction system. More particularly, it relates to a modular construction system for forming a knockdown modular structure, e.g. a stage or an exhibition stand.

Construction and knockdown times of knockdown modular structures can have significant cost implications. Shorter times may result in reduced labour costs and, in cases where such structures are rented, may reduce rental costs. Shorter times also reduce opportunity costs relating to such structures and to locations where they are constructed for temporary use.

SUMMARY OF THE DISCLOSURE

The systems described hereinbelow aim to facilitate construction of knockdown structures associated with short construction and knockdown times, high structural strength, and flexibility with regard to configuration.

According to a first aspect of this disclosure, there is provided a modular construction system including an elongate construction element, the element comprising: an elongate body including a longitudinal web, defining opposite first and second edges and a longitudinal first centreline, and a longitudinal first flange transverse to the web along the first edge, the elongate body defining opposite first and second ends; at the first end, a first end plate orthogonal to the first centreline; defined through the first end plate, a first hole on the first centreline, a second hole intermediate the first hole and the first edge, and a third hole intermediate the first hole and the second edge; and, for each of the holes, a cut-out in the web, the cut-out being adapted for insertion of a shaft of a bolt through the hole whilst accommodating the head of the bolt.

As will become apparent, the elongate construction element, in use, typically defines at least a part of a beam or a column.

The elongate body may include a longitudinal second flange transverse to the web and opposite to the first flange. In this case, the elongate body may have an H- or a channel cross-section.

The web may have three holes defined therethrough at a position intermediate the first and second ends, the holes including a fourth hole on the centreline and a fifth and a sixth hole offset from the fourth hole towards the first edge and the second edge, respectively. These holes may provide, inter alia, for the elongate construction element, now referred to as the first elongate construction element, and a second and a third such elongate construction element, to be interconnected in a "+" configuration in which: the respective centrelines of the second and the third elongate construction elements are on a line perpendicular to the web of the first elongate construction element and passing through the first hole defined through the web of the first elongate construction element; all the flanges of the elongate construction elements are in two spaced apart parallel planes; the respective first end plates of the second and third elongate construction elements are adjacent to and on opposite sides of the first elongate construction element; and the first end plate of the second elongate construction element is tied to the first end plate of the third elongate construction element via at least one fastening member or at least one series of fastening members extending through corresponding holes in the end plates and in the web of the first elongate construction element.

The elongate construction element may include along the first flange at least one securing formation for securing another element, for example: an identical element, to the elongate construction element. The securing formation may include a hole defined in the first flange. The web may define a cut-out at the hole, for example: for receiving a nut to cooperate with a shaft of a bolt which may be inserted through the hole for securing another element to the securing formation. The elongate construction element may include a nut or an equivalent internally threaded element within the cut-out and in register with the hole.

In the case of the elongate construction element including a second flange, it may include along the second flange at least one securing formation such as that defined above in respect of the first flange.

The system may include a first type jointing element including: a head defining about a centreline thereof four end plate connector formations at angular spacings of 90°, each connector formation. being matched to the three holes defined in an end plate of an elongate construction element, as defined above, to provide for the end plate to be secured to the connector formation via suitable fasteners; and a column connector formation projecting from the head along its centreline for connecting the jointing element to a top of a column.

Each end plate connector formation may include three threaded bores, corresponding to the holes in the end plate, spaced along the centreline of the head.

The head may define in an end thereof opposite to the column connector formation a threaded bore on its centreline, for connecting another element, for example: an elongate construction element, thereto via a suitable fastener.

The column connector formation may be a spigot for cooperating with a matching socket defined in a top of a column.

The first type jointing element, as defined above, is believed novel per se.

The system may include a second type jointing element including a square web and four flanges transverse to the web and extending along the respective sides of the web, in which: each flange has three end plate connector formations spaced apart along its length; each connector formation includes a hole in the flange and a web cutout at the hole for accommodating a nut; and the spacing of the holes matches that of the spacing of the holes in the first end plate of an elongate construction element, as defined above.

The length of each flange of the second type jointing element may be the same as the depth of the elongate construction element.

The second type jointing element may include, within at least some of the cutouts, a nut or an equivalent internally threaded element in register with the associated hole in the adjacent flange.

The second type jointing element, as defined above, is believed novel per se.

BRIEF DESCRIPTION OF THE DRAWINGS

Preferred embodiments are described hereinbelow by way of example only with reference to the accompanying drawings, in which.

DESCRIPTION OF PREFERRED EMBODIMENTS

Figure 1:
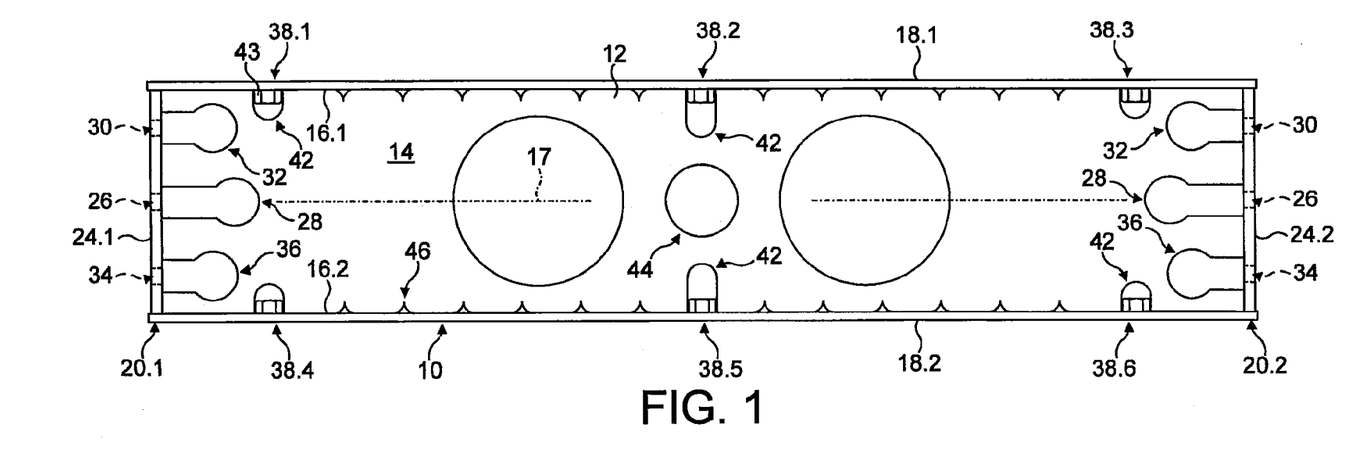
FIG. 1 is a side view of an elongate construction element of a modular construction system.
Figure 2:
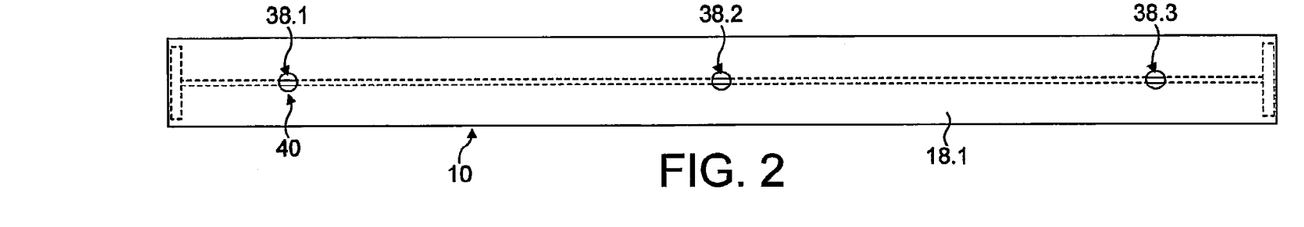
FIG. 2 is a top view of the element of FIG. 1.
Figure 3:
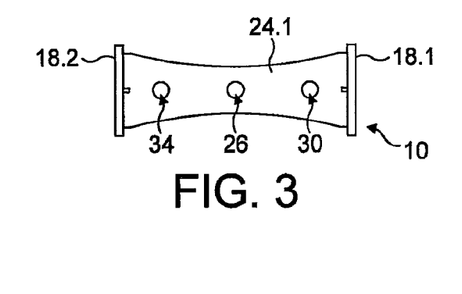
FIG. 3 is an end view of the element of FIG. 1.

In FIGS. 1 to 3, an embodiment of elongate construction element of a modular construction system is designated generally by the reference numeral 10.

The construction element 10 may be made of any suitable material, for example: mild steel, stainless steel, and so forth. The same applies to each other element described below.

The element 10 has an elongate body 12 including: a longitudinal web 14, defining opposite first and second edges 16.1 and 16.2 and a first centreline 17; a longitudinal first flange 18.1, transverse to the web 14 along the first edge 16.1; a longitudinal second flange 18.2, transverse to the web 14 along the second edge 16.2; and opposite first and second ends 20.1 and 20.2.

The element 10 also includes: at the first end 20.1, a first end plate 24.1 orthogonal to the first centreline 17; at the second end 20.2, a second end plate 24.2 orthogonal to the centreline 17; a first hole 26 defined through the first end plate, on the centreline 17; a second hole 30 defined through the first end plate, intermediate the first hole and the first edge 16.1; and a third hole 34 defined through the first end plate, intermediate the first hole and the second edge 16.2.

The holes 26, 30 and 34 are equally spaced.

In the web 14, cut-outs 28, 32 and 36 have been made for the holes 26, 30 and 34, respectively, each cut-out being adapted to allow insertion of a shaft of a bolt through the associated hole whilst accommodating the head of the bolt. The cut-outs 28, 32 and 36 are all substantially keyhole or mushroom shaped.

Mirroring holes 26, 30 34, and cut-outs 28, 32 and 36 are defined in the second end 20.2.

The element 10 includes six securing formations 38.1 to 38.6, all of which are substantially the same. In view of this, only the securing formation 38.1, along the first flange 18.1 at a position near the first end 20.1, is described in detail. The securing formation 38.1 includes a hole 40 (see FIG. 2) defined in the flange 18.1 and a web cut-out 42 at the hole. A bolt 43 is received in the cut-out 42 and welded to the flange 18.1. The securing formations 38 provide for other elongate construction elements to be secured to the element 10, or alternatively for a floor element, a ceiling element, a wall element, a bracing element, or the like, to be secured to the element 10.

The securing formations 38.2 and 38.5 are at the centre of the element 10. Between the cut-outs 42 of these securing formations, a fifth hole 44 is defined through the web 14. The respective cut-outs 42 of the securing formations 38.2 and 38.5 double as fifth and sixth holes, respectively, through the web 14 that are offset from the hole 44 towards the first edge 16.1 and the second edge 16.2, respectively. The purpose of the hole 44 and the fifth and sixth holes will become apparent from the remainder of this description.

Along each of the first edge 16.1 and the second edge 16.2 is defined a series of spaced apart notches 46. The purpose of these notches is to serve as weld guides. The body 12 is made up by welding the flanges 18.1 and 18.2 to the web 14. Lengths of the edges 16.1 and 16.2 between adjacent notches 46 are alternately welded on opposite sides of the web 14. Each such length is welded on one side of the web only, whereas the adjacent ones are welded on the opposite side of the web only. The notches 46 merely serve as guides for such welding. In alternative embodiments, a body similar to the body 12 may be made from a hot rolled I- or H-profile.

Figure 4:
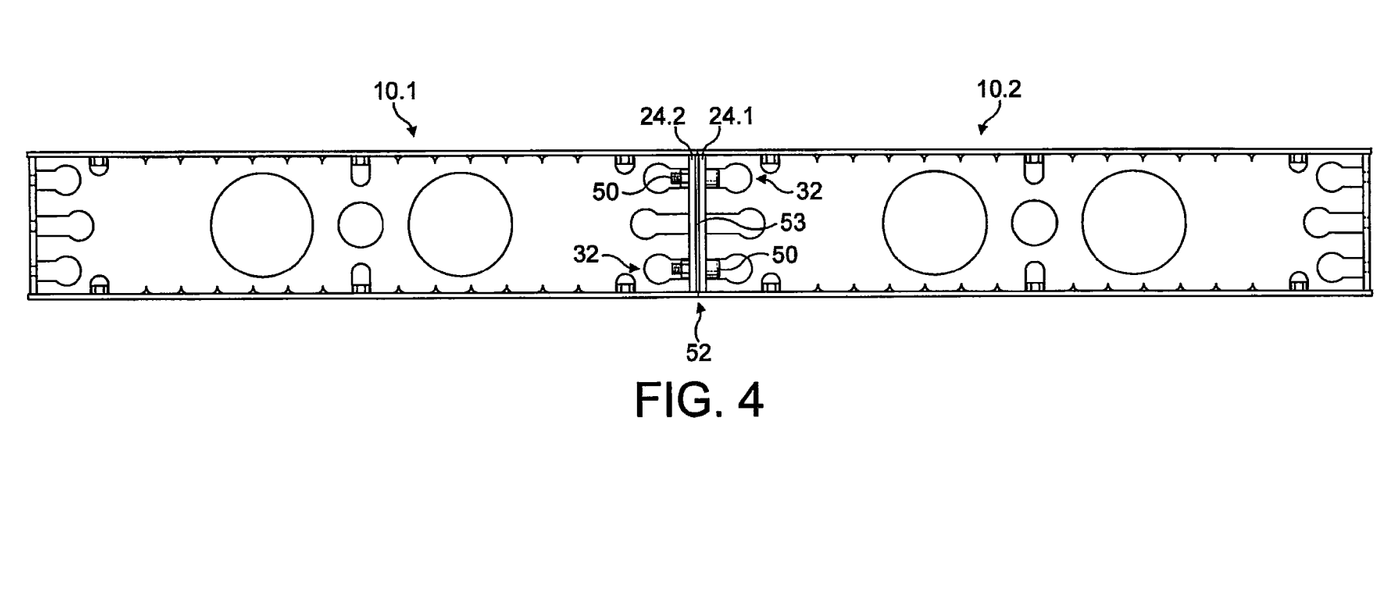
FIG. 4 shows an assembly including two elements such as that of FIG. 1, secured together via suitable fasteners.

In FIG. 4, two elongate construction elements 10.1 and 10.2 identical to the element 10 of FIG. 1 have been secured end to end via two threaded combinations 50 extending respectively through registering holes 30 and 34 (see FIGS. 1 and 3) of the respective end plates 24.2 and 24.1 of the elements 10.1 and 10.2. As a result, a joint 52 is defined which has a high bending capacity about an axis 53 extending through the joint and perpendicular to the webs 14. If required, the shear capacity of the joint 52 may be increased by securing another threaded combination through the holes 26 (see FIGS. 1 and 3) of the respective end plates 24.2 and 24.1.

In this case, each threaded combination includes an Alan bolt and a matching nut. The width of the part of each cut-out 32 in which the corresponding nut is received is such that the web 14 interferes with rotation of the nut, obviating the need for a tool to hold the nut during tightening or loosening of the associated bolt.

In the above example, the body 12 has an I-cross-section. In alternative embodiments (not shown) of the elongate construction element, the body may have an H-, L-, or channel cross-section.

Figure 5:
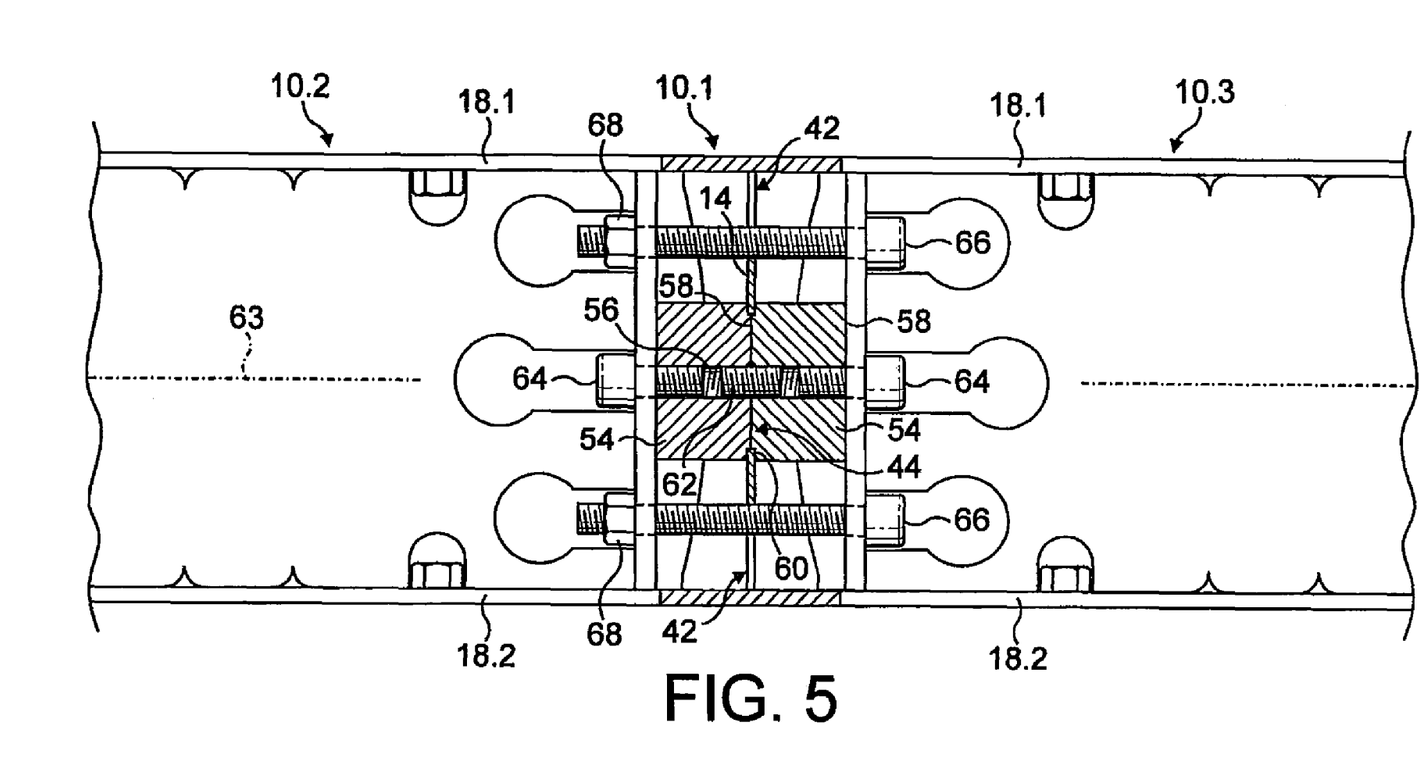
FIG. 5 shows an assembly including three elements such as that of FIG. 1, secured together via suitable fasteners and spacers.

In FIG. 5, the elements 10.1 and 10.2 are shown interconnected with an identical element 10.3 in a "+" configuration by way of a number of threaded connectors, including two identical spacer/connectors 54. Each spacer/connector 54 is annular in cross-section, defining therethrough a threaded bore 56. The connector defines at opposite ends thereof flat annular abutment surfaces 58 and, at one end, an annular seat 60 for seating on the web 14 around the hole 44.

The method of interconnection is now described.

In order to secure the spacer/connectors 54 to the web 14 of the element 10.1, a threaded rod 62 is first screwed halfway to one of the connectors 54. This connector is then placed against one side of the web 14 with its seat formation 60 seating on the web around the hole 44. The other spacer/connector 54 is now screwed on to a protruding half of the rod 62 on the other side of the web 14 until the seat formation 60 of this spacer/connector also seats on the web 14 around the hole 44, upon which the proximate abutment surfaces 58 of the respective connectors also abut.

The end plate 24.1 of the element 10.2 is placed against an outer abutment surface 58 of one of the spacer/connectors 54 with the centreline of the element aligned with a line 62 perpendicular to the web 14 of the element 10.1 and passing through the first hole 44 (see FIG. 1) defined through the web of the element 10.1 and with each web 18.1 and 18.2 of the element 10.2 coplanar with the corresponding web of the element 10.1. The end plate 24.1 of the element 10.2 is then secured to the said spacer/connector 54 via an Alan bolt 64.

The shafts of two Alan bolts 66 are inserted through the holes 30 and 34, respectively, defined through the end plate 24.1 of the element 10.3. The centreline of the element 10.3 is then aligned with the line 62, with this element opposite to the element 10.2 relative to the element 10.1 and with the plate 24.1 proximate to the element 10.1. The element 10.3 is then displaced towards the proximate spacer/connector 54 whilst routing the shafts of the bolts 66 through the respective cut-outs 42 (i.e. the fourth and the fifth holes) defined through the web 14 of the element 10.1. The end plate 24.1 is placed against the spacer/connector 54 and is then secured to the spacer/connector 54 via an Alan bolt 64. The bolts 66 are provided with nuts 68 and tightened.

Clearly, by omitting one of the members 10.2 or 10.3, say the former, from the above configuration, a T-configuration of the members 10.1 and 10.3 is achieved.

Figure 6:
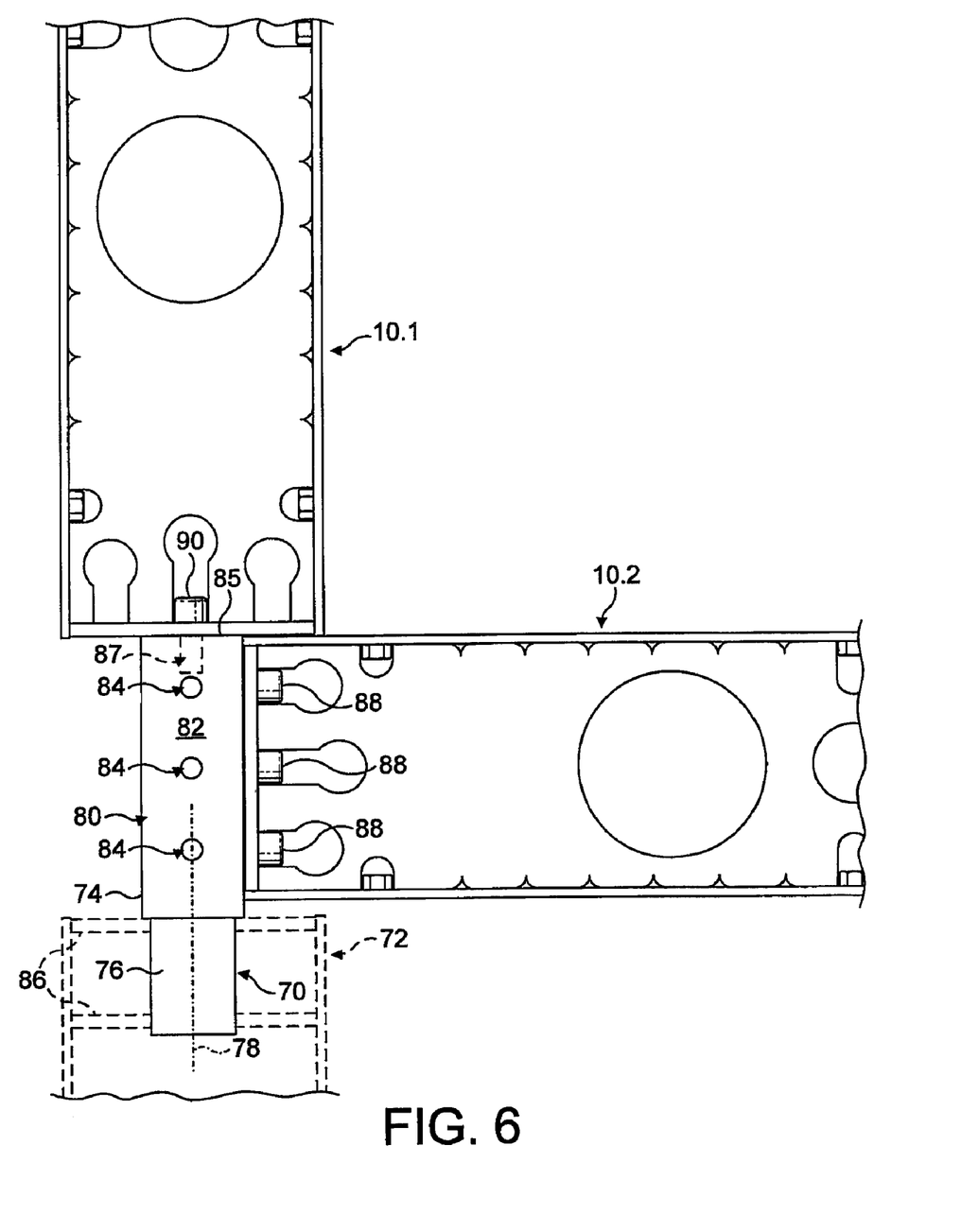
FIG. 6 shows an assembly including a first type jointing element and two elements such as that of FIG. 1, secured together via suitable fasteners, and a column (partly shown)

In FIG. 6, a first type jointing element is designated generally by the reference numeral 70. The element 70 is shown in an operative configuration with respect to the elongate construction elements 10.1 and 10.2 and a top part of a column 72.

The jointing element 70 includes a parallelepiped head 74 and a column connector formation in the form of a parallelepiped spigot 76 projecting from the head. The head 74 defines about a centreline 78 thereof four end plate connector formations 80 (of which only one is shown here) at angular spacings of 90°. Each connector formation 80 defines a flat abutment face 82 and three threaded bores 84 spaced along the centreline 78 at a spacing matching that of the holes 26, 30, and 34 (see FIGS. 1 and 3). The head 74 defines also a flat abutment face 85 in an end thereof opposite to the spigot 76 and a threaded bore 87 in the face 85 and on the centreline 78.

The column 72 has two socket defining plates 86, each defining therethrough a square hole providing a snug fit of the spigot 76 therein and thus effectively defining a socket.

In the configuration shown, the construction element 10.2 has been secured to one of the connector formations 80 of the head 74 of the jointing element 70 by means of three Alan bolts 88. As such, a joint defined between the element 10.2 and the column 72 has a high bending capacity. The jointing member 70 provides for connection of up to four elongate construction elements to it, in which case the four elements will define a "+" configuration.

In the configuration shown, the construction element 10.1 has also been secured to the jointing element 70 via an Alan bolt 90.

Figure 7:
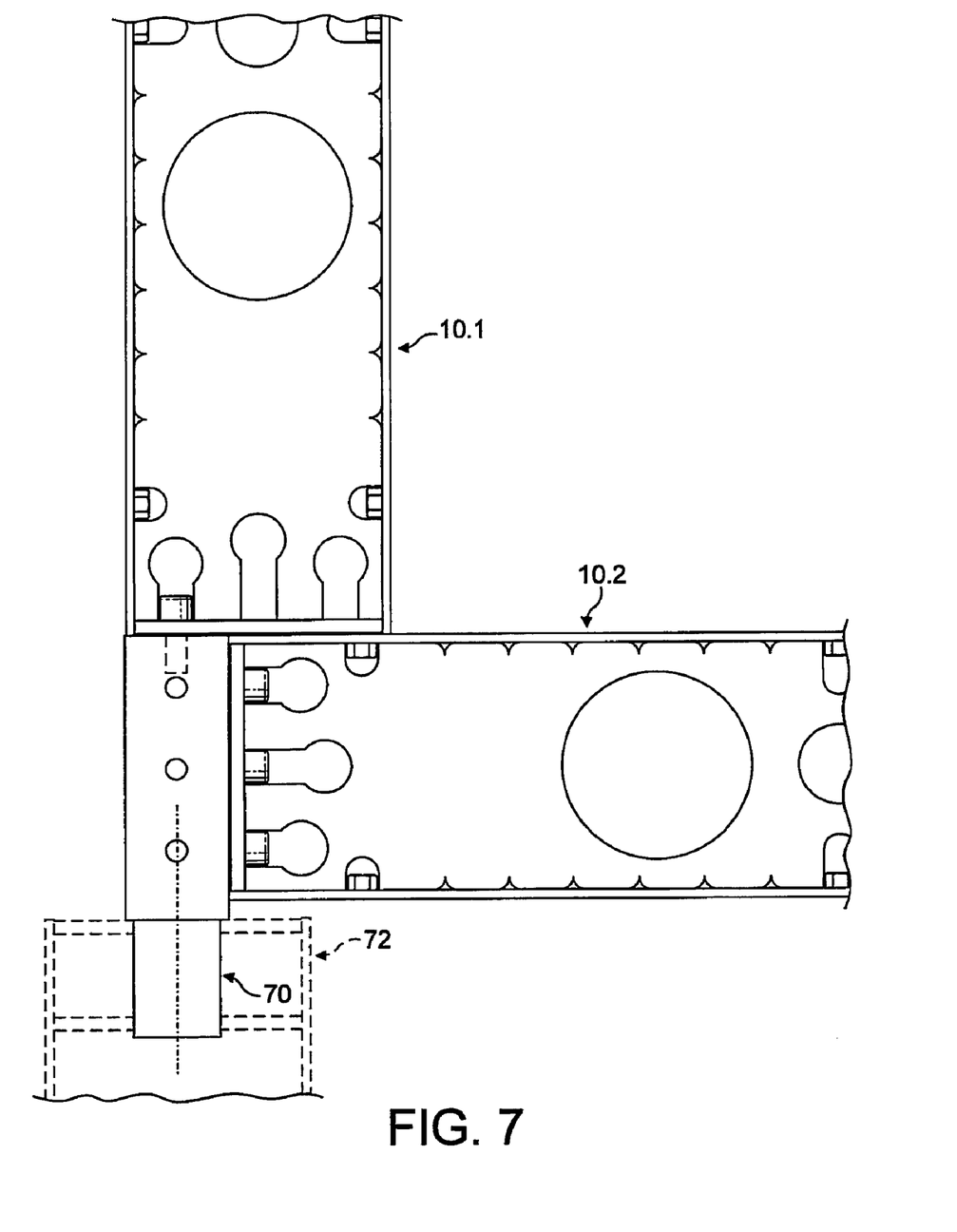
FIGS. 7 and 8 show variations of the assembly of FIG. 6.
Figure 8:
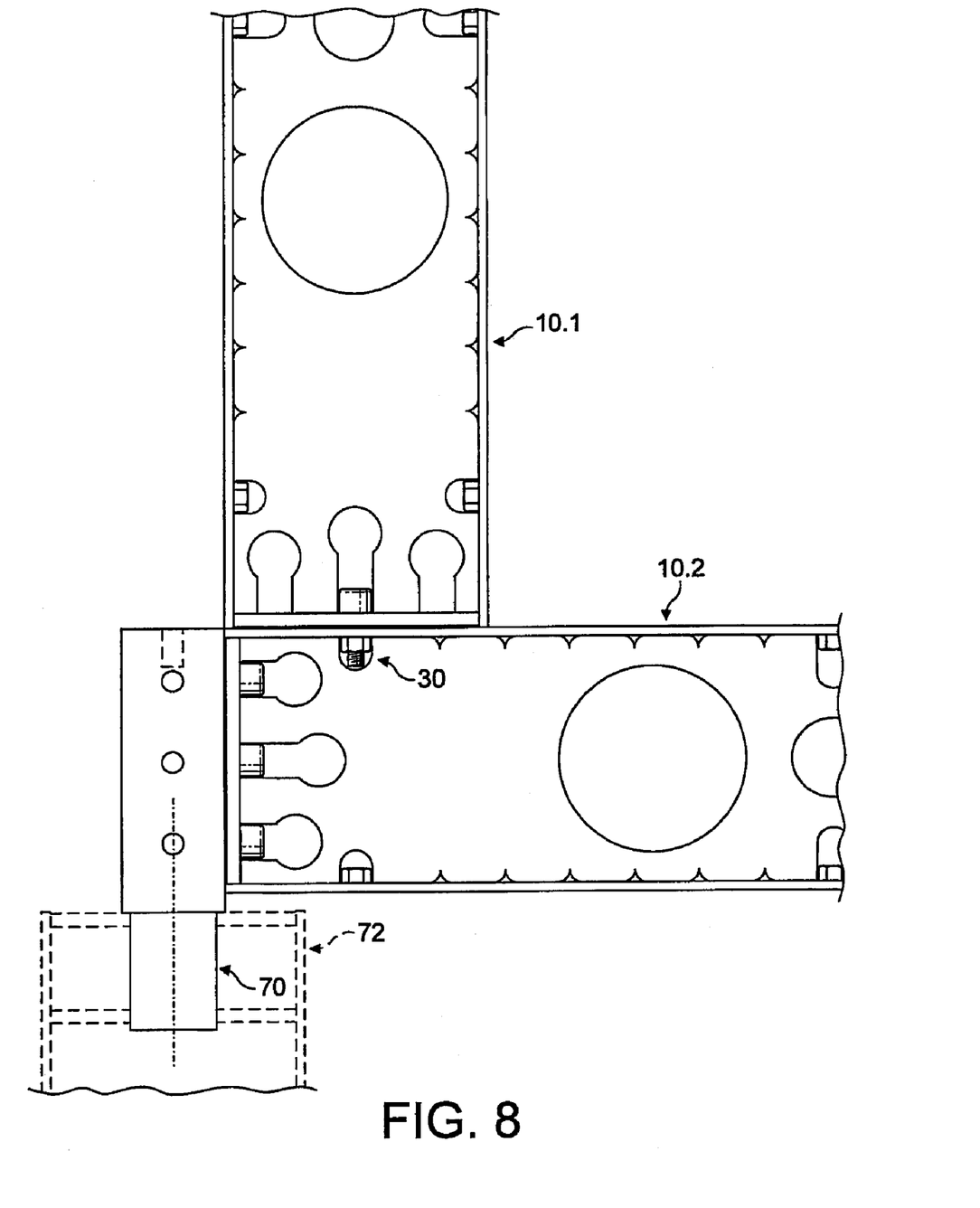

FIGS. 7 and 8 show respective assemblies similar to that shown in FIG. 6, but in which the elongate construction element 10.1 is in alternative positions relative to the remainder of the assembly. This illustrates the flexibility in structural configuration provided by, inter alia, the three holes defined through each end plate 24.1, 24.2 of each construction element 10.

Figure 9:
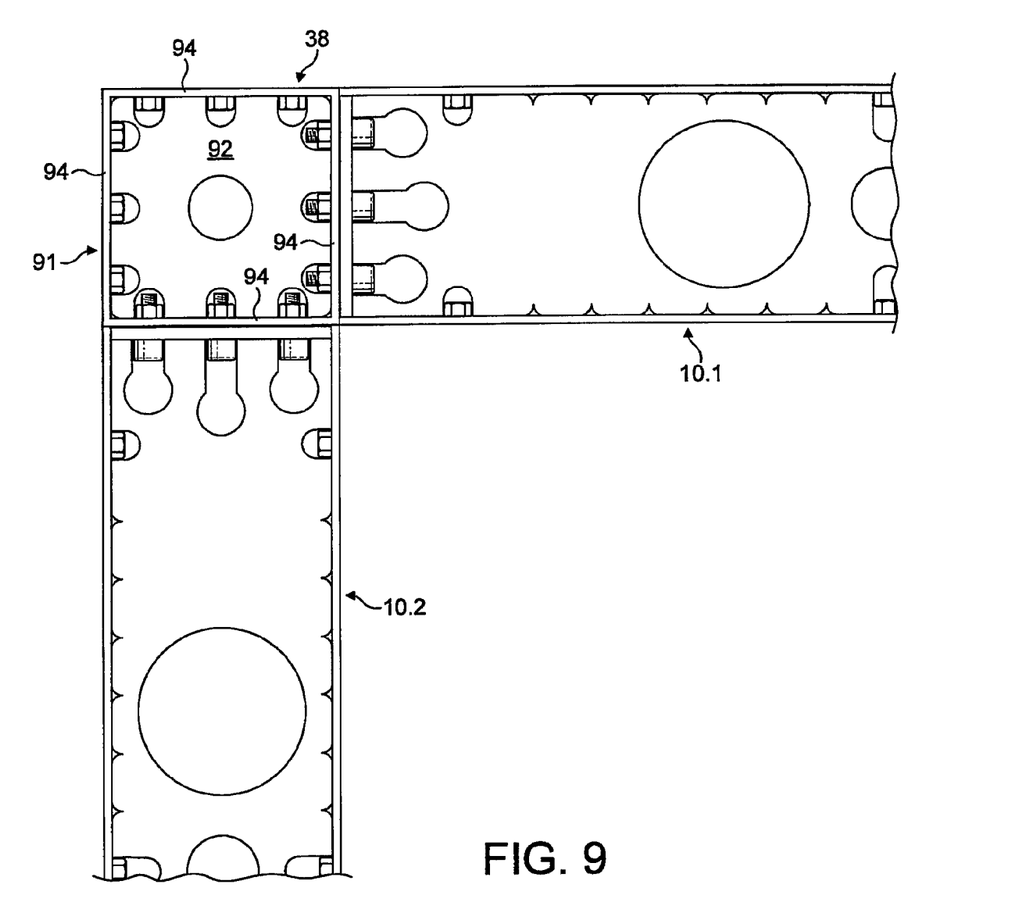
FIG. 9 shows an assembly including a second type jointing element and two elements such as that of FIG. 1, secured together via suitable fasteners.

In FIG. 9, a second type jointing element is designated generally by the reference numeral 91. The element 91 is shown in an operative configuration with respect to the elongate construction elements 10.1 and 10.2.

The jointing element 91 includes a square web 92 and four flanges 94 orthogonal to the web and extending along the respective side of the web. As is clear from FIG. 9, the length of each flange 94 is the same as the depth of each member 10. Each flange 94 has three securing formations 38, as described above with reference to FIG. 1, spaced along its length. These provide for connection of the elongate construction elements 10.1 and 10.2 to the jointing element 91 via suitable fasteners, for example: Alan bolts 88, in the configuration shown. They clearly also provide for securing of an additional two elongate construction elements to the element 91 to define a "+" configuration.

A joint thus defined between the elongate construction elements 10.1 and 10.2 again has a large bending capacity about an axis transverse to the web 92.

A construction system may include a number of elongate construction elements and jointing members such as the elements 10, 70, and 91 described above, a plurality of fasteners, and so forth. The system may clearly be used to construct knockdown or permanent structures of highly variable configurations, as required.

Figure 10:
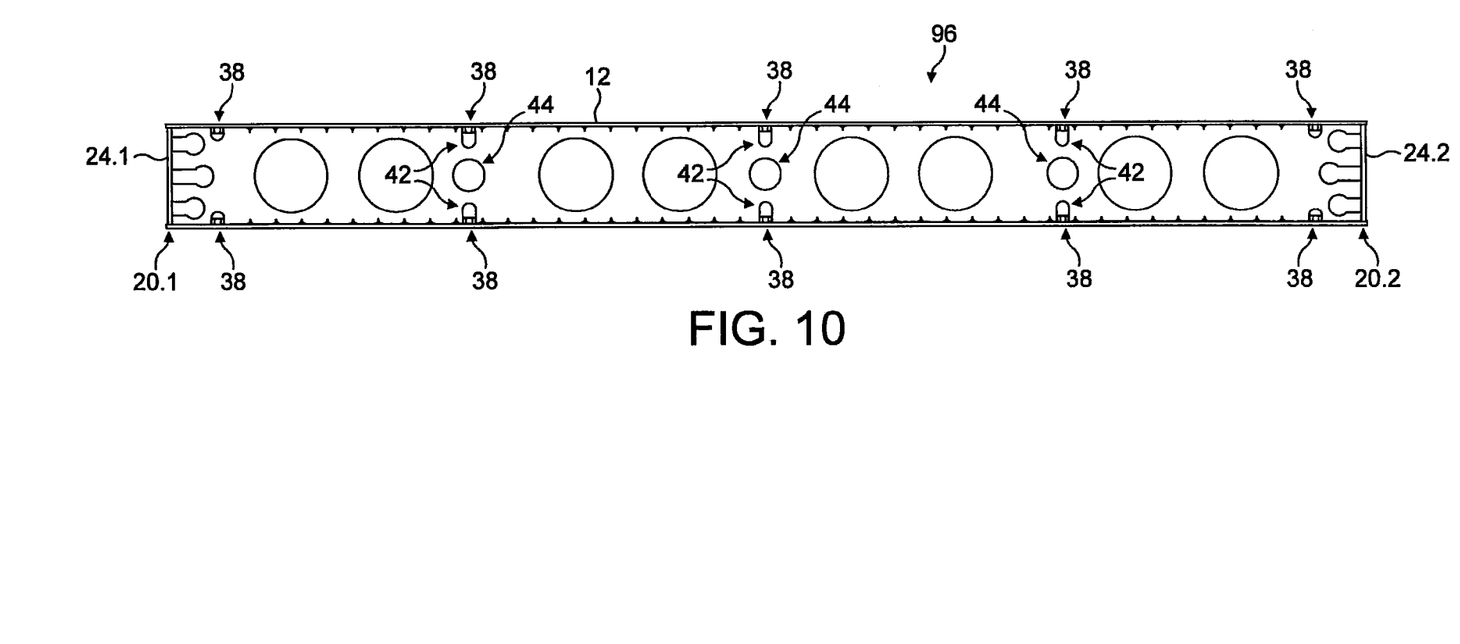
FIG. 10 is a side view of another embodiment of elongate construction element of a modular construction system.

In FIG. 10, another embodiment of elongate structural element of a modular construction system is designated generally by the reference numeral 96. The element 96 includes many features identical or similar to those of the element 10 of FIGS. 1 to 3. Such features are again designated by the same reference numerals as before and a description of these features is not repeated here.

The member 96 is substantially longer than the member 10 and has more securing formations 38, holes 44, and cutouts 42.

The modular construction system may thus include elongate structural elements of different lengths to suit different positions in a structure. Applicant has found a range of elongate structural elements ranging in length from 500 mm to 6000 mm, in increments of 500 mm, to be suitable for a modular construction system.

Figure 11:
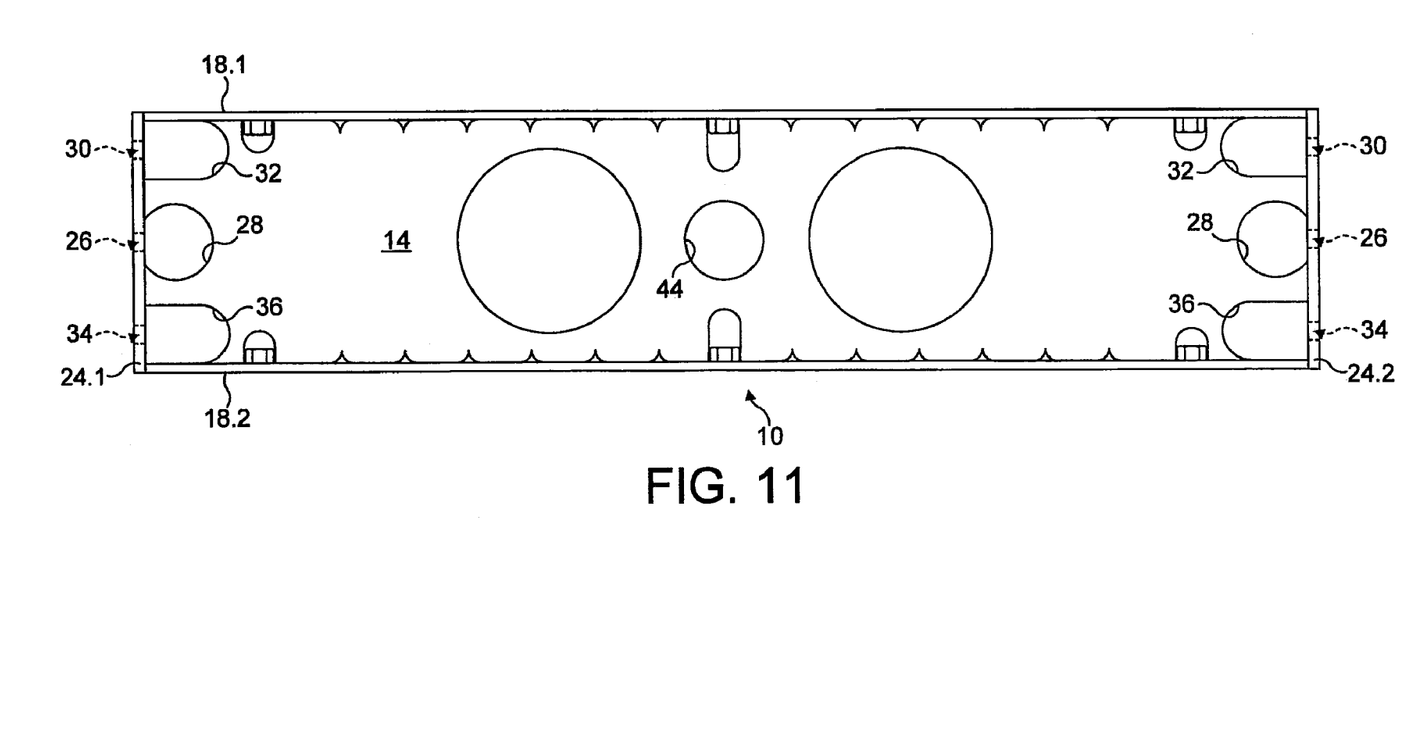
FIG. 11 is a side view of a further embodiment of elongate construction element of a modular construction system.

FIG. 11 shows a variation of the elongate structural element 10, providing for further flexibility in the way in which such structural elements may be connected together to form structures. Like reference numerals are used for like parts to those of the embodiment of FIGS. 1 to 3.

In the elongate structural element 10 shown in FIG. 11, the cut-outs 28, 32 and 36 in web 14 take different configurations from those of the arrangement of FIGS. 1 to 3. While cut-outs 28, 32 and 36 are positioned to correspond to the positions of holes 26, 30 and 34 in the respective end plates 24.1 and 24.2, as in the embodiment of FIGS. 1 to 3, cut-out 28 located on the centreline of web 14 here has a substantially circular profile of a similar diameter to that of fifth hole 44 at the mid-point of the web. Cut-outs 32 and 36 are wider than the corresponding cut-outs of the embodiment of FIGS. 1 to 3 and extend to the flanges 18.1 and 18.2.

FIG. 5 showed how two elongate structural elements 10.2 and 10.3 could be connected via their end plates and cut-outs 42 and fifth hole 44 at the mid portion of a third element 10.1, using suitable spacers and connectors to form a generally "+" configuration. With elongate structural elements having cut-outs 28, 32 and 36 as shown in FIG. 11, a similar connection can be made at the left or right end of the third element 10.1 rather than at its mid portion, resulting in a generally "T", shaped structure.

All three cut-outs 28, 32 and 36 of the FIG. 11 embodiment are wider than the corresponding cut-outs of the embodiment of FIGS. 1 to 3, which allows for easier insertion of the shaft of a bolt through the related hole and accommodation and access to the head of the bolt.

The invention claimed is:

1. A modular construction system including an elongate construction element, the element comprising: an elongate body including a longitudinal web, defining opposite first and second edges and a longitudinal first centreline, and a longitudinal first flange transverse to the web along the first edge, the elongate body defining opposite first and second ends; at the first end, a first end plate orthogonal to the first centreline, extending to and joining to the first flange; defined through the first end plate, a first hole on the first centreline, a second hole intermediate the first hole and the first edge, and a third hole intermediate the first hole and the second edge; and, for each of the holes, a cut-out in the web, the cut-out being adapted to allow insertion of a shaft of a bolt through the hole whilst accommodating the head of the bolt.

2. A modular construction system according to claim 1, wherein two said elongate construction elements, which may be the same or different are connected to each other via holes defined through the first end plates of the respective elongate construction elements to define a connection or joint having a high bending capacity and a high shear capacity.

3. A modular construction system according to claim 2, wherein two first end plates of identical sections are interconnected with corresponding holes in register and with fasteners, extending through the respective holes in register, thereby defining a joint having a high bending capacity in both directions about an axis at the joint and perpendicular to the webs of the elongate construction elements and also having a high shear capacity.

4. A modular construction system according to claim 3, wherein said fasteners are respective bolt and nut combinations.

5. A modular construction system according to claim 1, wherein at least one of the cut-outs of said elongate construction element is substantially key-hole or mushroom shaped, comprising a generally constant width part extending from the first end plate and a wider part, preferably having a generally semicircular outline.

6. A modular construction system according to claim 1, wherein the elongate body includes a longitudinal second flange transverse to the web along the second edge; the cut-out associated with the first hole has a substantially circular profile; and the cut-outs associated with the second and third holes extend to the first and second flanges.

7. A modular construction system according to claim 1, wherein the second end of the elongate construction element has a second end plate selected from geometrically similar and geometrically identical end plates.

8. A modular construction system according to claim 1, wherein the elongate body of the elongate construction element has a longitudinal second flange transverse to the web and opposite to the first flange, whereby the elongate body has an H- or channel cross-section.

9. A modular construction system according to claim 1, wherein the web of the elongate construction element has three holes defined therethrough at a position intermediate the first and second ends, the holes including a fourth hole on the centreline and a fifth and a sixth hole offset from the fourth hole towards the first edge and the second edge, respectively.

10. A modular construction system according to claim 9, comprising three elongate construction elements, namely: a first elongate construction element comprising an elongate construction element as defined in claim 9, and a second and a third elongate construction element; the second and third elongate construction elements being interconnected with the first elongate construction element in a "+" configuration in which: the respective centrelines of the second and the third elongate construction elements are on a line perpendicular to the web of the first elongate construction element and passing through the first hole defined through the web of the first elongate construction element; all the flanges of the elongate construction elements are in two spaced apart parallel planes; the second and third elongate construction elements having respective first end plates that are adjacent to and on opposite sides of the first elongate construction element; the first end plate of the second elongate construction element being tied to the first end plate of the third elongate construction element by fastening means selected from at least one fastening member and at least one series of fastening members, the fastening means extending through corresponding holes in the end plates and in the web of the first elongate construction element.

11. A modular construction system according to claim 1, wherein the elongate construction element includes along the first flange at least one securing formation for securing another element to the elongate construction element.

12. A modular construction system according to claim 11, wherein the securing formation includes a hole defined in the first flange, the web defining a cut-out at the hole adapted for receiving an internally threaded element to cooperate with a shaft of a bolt which may be inserted through the hole for securing another element to the securing formation.

13. A modular construction system according to claim 1, further comprising a first type jointing element including: a head defining about a centreline thereof four end plate connector formations at angular spacings of 90°, each end plate connector formation being matched to the three holes defined in an end plate of an elongate construction element, as defined in claim 1, to provide for the end plate to be secured to the connector formation via fasteners; and a column connector formation projecting from the head along its centreline for connecting the jointing element to a top of a column.

14. A modular construction system according to claim 13, wherein each end plate connector formation includes three threaded bores, corresponding to the holes in the end plate, spaced along the centreline of the head.

15. A modular construction system according to claim 13, wherein the head defines in an end thereof opposite to the column connector formation a threaded bore on its centreline, for connecting another element thereto.

16. A modular construction system according to claim 13, wherein the column connector formation may comprises a spigot adapted to cooperate with a matching socket defined in a top of a column.

17. A modular construction system according to claim 1, further comprising a second type jointing element including: a square web and four flanges transverse to the web and extending along the respective sides of the web, in which: each flange has three end plate connector formations spaced apart along its length; each connector formation includes a hole in the flange and a web cutout at the hole for accommodating a nut; and the spacing of the holes matches that of the spacing of the holes in the first end plate of an elongate construction element, as defined in claim 1.

18. A modular construction system according to claim 17, wherein the length of each flange of the second type jointing element is the same as the depth of the elongate construction element.

19. A modular construction system according to claim 17, wherein the second type jointing element includes, within at least some of the cutouts thereof, an internally threaded element in register with the associated hole in the adjacent flange.

* * * * *